(12) United States Patent
Jung (10) Patent No.: US 12,451,804 B2
(45) Date of Patent: Oct. 21, 2025

(54) POWER CONVERTER SYSTEM (71) Applicant: Cirrus Logic International Semiconductor Ltd., Edinburgh (GB)

(72) Inventor: ByeongOk Jung, Seoul (KR)

(73) Assignee: Cirrus Logic Inc., Austin, TX (US)

( * ) Notice: Subject to any disclaimer, the term of this patent is extended or adjusted under 35 U.S.C. 154(b) by 293 days.

(21) Appl. No.: 18/308,370

(22) Filed: Apr. 27, 2023

(65) Prior Publication Data

US 2024/0364218 A1 Oct. 31, 2024

(51) Int. Cl.
*H02M 3/158* (2006.01)
*H02M 1/00* (2006.01)
*H02M 3/157* (2006.01)

(52) U.S. Cl.
CPC ......... *H02M 3/158* (2013.01); *H02M 1/0009* (2021.05); *H02M 3/157* (2013.01)

(58) Field of Classification Search
CPC ..... H02M 3/158; H02M 1/0009; H02M 3/157
See application file for complete search history.

(56) References Cited

U.S. PATENT DOCUMENTS

| | | | | |
|---|---|---|---|---|
| 11,165,350 B2* | 11/2021 | Giuliano | ............. | H02M 1/0043 |
| 11,422,617 B2* | 8/2022 | Wang | .................... | G06F 1/3296 |
| 2015/0180355 A1 | 6/2015 | Freeman et al. | | |
| 2020/0099257 A1 | 3/2020 | Qiu et al. | | |
| 2022/0103065 A1 | 3/2022 | Puggalli et al. | | |
| 2022/0311339 A1 | 9/2022 | Yen et al. | | |
| 2022/0321001 A1 | 10/2022 | Huang et al. | | |
| 2022/0407417 A1* | 12/2022 | Flaibani | ................ | H02M 3/158 |

FOREIGN PATENT DOCUMENTS

WO 2020086507 A1 4/2020
WO 2022213007 A2 10/2022

OTHER PUBLICATIONS

Combined Search and Examination Report under Sections 17 and 18(3), UKIPO, Application No. GB2401538.0, dated Jan. 7, 2025.

* cited by examiner

*Primary Examiner* — Rafael O De Leon Domenech
(74) *Attorney, Agent, or Firm* — Jackson Walker L.L.P.

(57) ABSTRACT

A power converter system comprising: a switched capacitor power converter; an always-on power converter; and a controller, wherein the power converter system is operable in a first mode of operation in which only the always-on power converter supplies output power and a second mode of operation in which the switched capacitor power converter supplies output power, and wherein the controller is configured to transition the power converter system from the first mode to the second mode based on a parameter of a current and/or a voltage of output power supplied by the power converter system.

16 Claims, 4 Drawing Sheets

POWER CONVERTER SYSTEM

FIELD OF THE INVENTION

The present disclosure relates to a power converter system.

BACKGROUND

Portable electronic devices such as laptop computers, tablet computers, mobile telephones and the like can typically be powered by an external power source such as a Universal Serial Bus (USB) power supply or, when an external power source is unavailable, by an internal battery or battery pack of the device. Such devices typically include a plurality of subsystems (e.g. a display subsystem, a processor subsystem, a memory subsystem, a communications subsystem, etc.), and these subsystems may have different power supply requirements. For example, some subsystems may require a different supply voltage than other subsystems. Consequently, portable electronic devices typically include a power distribution system including one or more power converters to generate the required supply voltages from a voltage supplied by the internal battery and/or the external power source.

SUMMARY

According to a first aspect, the invention provides a power converter system comprising: a switched capacitor power converter; an always-on power converter; and a controller, wherein the power converter system is operable in a first mode of operation in which only the always-on power converter supplies output power and a second mode of operation in which the switched capacitor power converter supplies output power, and wherein the controller is configured to transition the power converter system from the first mode to the second mode based on a parameter of a current and/or a voltage of output power supplied by the power converter system.

The parameter of the current and/or the voltage of the output power may comprise one or more of: a magnitude of an output current of the always-on converter; a magnitude of an output voltage of the always-on converter; and a magnitude of an output voltage of the power converter system.

The switched capacitor power converter may be coupled in parallel with the always-on power converter.

The switched capacitor power converter may be coupled in series with the always-on power converter.

The controller may be configured to bypass the switched capacitor power converter in the first mode.

The always-on power converter circuitry may comprise inductive converter circuitry.

The parameter of the current and/or the voltage of the output power may comprise a magnitude of an output ripple current of the always-on converter.

The always-on power converter circuitry may comprise low dropout regulator circuitry.

The power converter system may further comprise voltage and/or current monitoring circuitry configured to monitor one or more of: an output current of the always-on converter; an output voltage of the always-on converter; and an output voltage of the power converter system.

The controller may be further configured to transition the power converter system from the second mode to the first mode based on a parameter of a current and/or a voltage of the output power.

The always-on converter may be disabled or deactivated in the second mode of operation of the power converter system.

The always-on converter and the switched capacitor power converter may both be enabled or activated in the second mode of operation of the power converter system.

According to a second aspect, the invention provides an integrated circuit comprising: the controller; and/or a switch network for the switched capacitor power converter; and/or a switch network for the always-on power converter of the power converter system of the first aspect.

According to a third aspect, the invention provides a host device comprising the power converter system of the first aspect.

The host device may comprise a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

According to a third aspect, the invention provides a power converter system comprising: a switched capacitor power converter; an always-on power converter; and a controller configured to deactivate and/or bypass the switched capacitor power converter in response to detection that the power converter system is in a quiescent operating condition.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the invention will now be described, strictly by way of example only, with reference to the accompanying drawings, of which.

DETAILED DESCRIPTION

Figure 1:
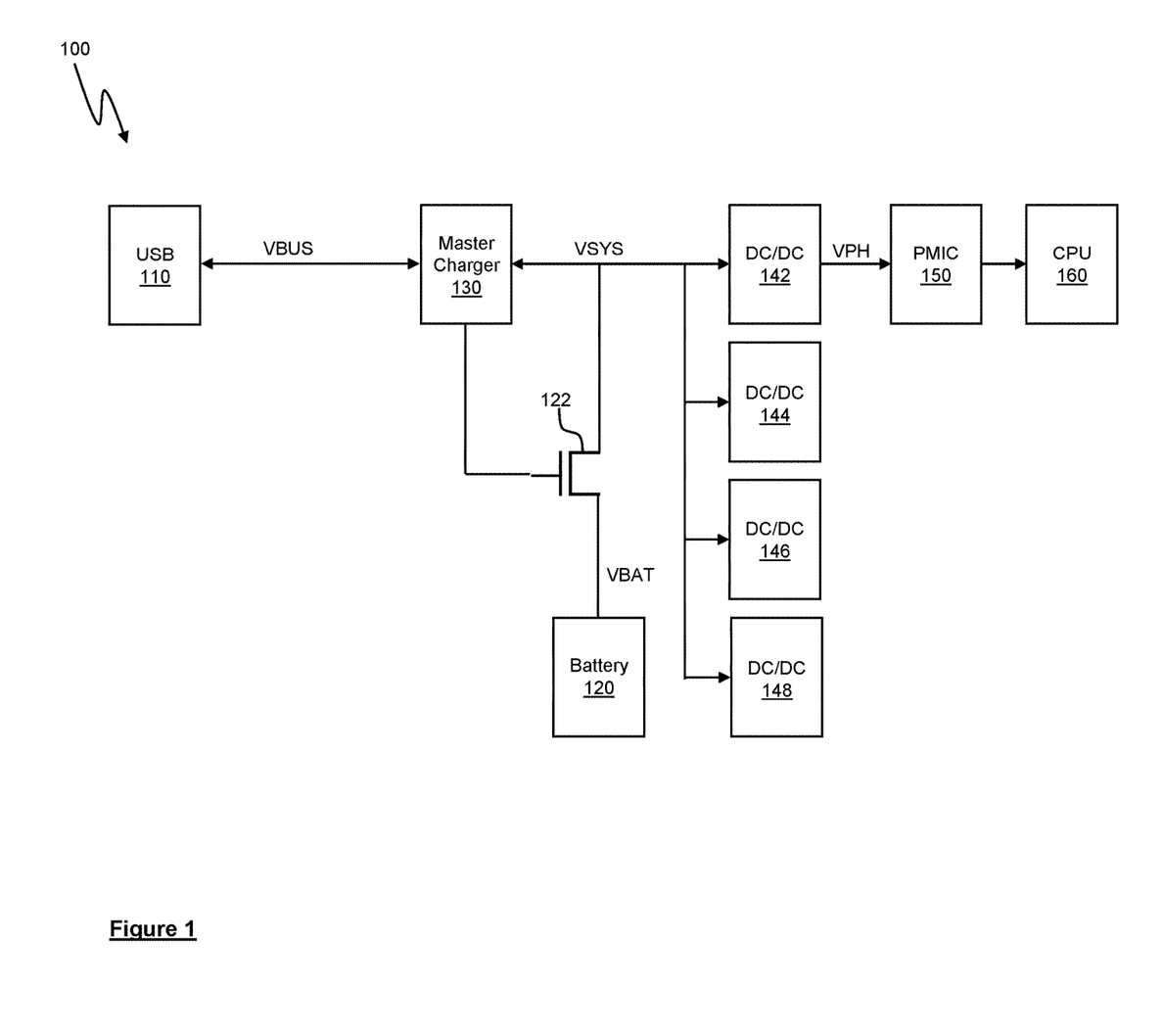
FIG. 1 is a schematic representation of a power distribution system for a portable electronic device such as a laptop computer.

FIG. 1 is a schematic representation of an example power distribution system for a host device such as a laptop computer. It should be noted that FIG. 1 shows only those features of the power distribution that are relevant to the present disclosure, and that a practical implementation of a power distribution system may include additional features that are not shown in FIG. 1 or described here.

The power distribution system (shown generally at 100 in FIG. 1) in this example comprises a power supply connector 110 (e.g. a socket) for receiving a complementary connector (e.g. a plug) of an external power supply apparatus such as a USB power supply. The power distribution system 100 also includes or is coupled to a battery 120 which can supply power if an external power supply apparatus is unavailable or disconnected. The power distribution system 100 further comprises a master charger 130, a plurality (in this example four) of power converters 142-148, which in this example are DC-DC converters, and a power management IC (PMIC) 150.

The master charger 130 is configured to receive a voltage VBUS from the power supply connector 110 and to output a system voltage VSYS. The master charger 130 also controls a battery switch 122 which can couple the battery 120 to the master charger 130 and to the DC-DC converters 142-148.

Thus, if an external power supply apparatus is connected to the power supply connector 110, the master charger 130 can cause the battery switch 122 to close if the battery 120 is in a discharged or partially discharged condition, thereby supplying the system voltage VSYS to the battery 120 to re-charge the battery 120. If no external power supply apparatus is connected to the power supply connector 110, the master charger 130 causes the battery switch 122 to close, such that the battery 120 can supply a battery voltage VBAT to the DC-DC converters 142-148 as the system voltage VSYS.

The DC-DC converters 142-148 are each configured to convert the system voltage VSYS into a respective DC output voltage. A first DC-DC converter 142 is configured to supply a first DC output voltage VPH to the PMIC, which in turn provides a supply voltage to a central processing unit (CPU) of the host device. The first DC-DC converter may be configured as an always-on DC-DC converter, such that the first DC-DC converter 142 continues to output the first output voltage VPH even when the host device is operating in a low-power or power-saving mode such as a sleep mode, to ensure that the CPU and host device can rapidly resume operation in a full-power mode in response to an event, interrupt or the like received when the host device is in a low-power or power-saving mode.

The other DC-DC converters 144-148 are configured to convert the system voltage into DC output voltages for use as supply voltages to other components or subsystems of the host device. The DC output voltages output by the DC-DC converters may be different from each other. For example, the first DC output voltage output VPH by the first DC-DC converter 142 may have a magnitude of 3.3V, whereas a second DC output voltage output by a second DC-DC converter 144 may have a magnitude of 3V, a third DC output voltage output by a third DC-DC converter 146 may have a magnitude of 1.8V, and a fourth DC output voltage output by a fourth DC-DC converter 148 may have a magnitude of 5V.

As the CPU 160 may require a relatively high current when the host device is operating in the full-power mode, the first DC-DC converter 142 should be capable of supporting a relatively high output current. However, when the host device is operating in the sleep mode with the CPU inactive or operating in a low-power mode, it is important that power consumption is minimised. Thus, the first DC-DC converter 142 should also have low quiescent power consumption, i.e. the power consumed by the first DC-DC converter 142 when the CPU is inactive or operating in its low-power mode should be low.

The first DC-DC converter 142 may be implemented using a high-efficiency switched-capacitor DC-DC converter to meet the requirement for high output current. However, the quiescent current drawn by a switched-capacitor power converter is typically significantly higher than the quiescent current drawn by other types of DC-DC power converter. For example, a switched-capacitor DC-DC power converter may have a quiescent current of the order of 485 microamperes, whereas an inductive DC-DC power converter capable of providing an equivalent input voltage to output voltage ratio may have a quiescent current of the order of 120 microamperes, and a low dropout regulator (LDO) may have a quiescent current of the order of 20 microamperes.

The present disclosure provides a power converter system that has low quiescent power consumption, e.g. when a load such as a CPU that receives power from the power converter system is operating in a low-power mode or sleep mode of operation, but is also capable of supporting a high load current requirement, e.g. when the load is operating in a full-power mode of operation.

Figure 2:
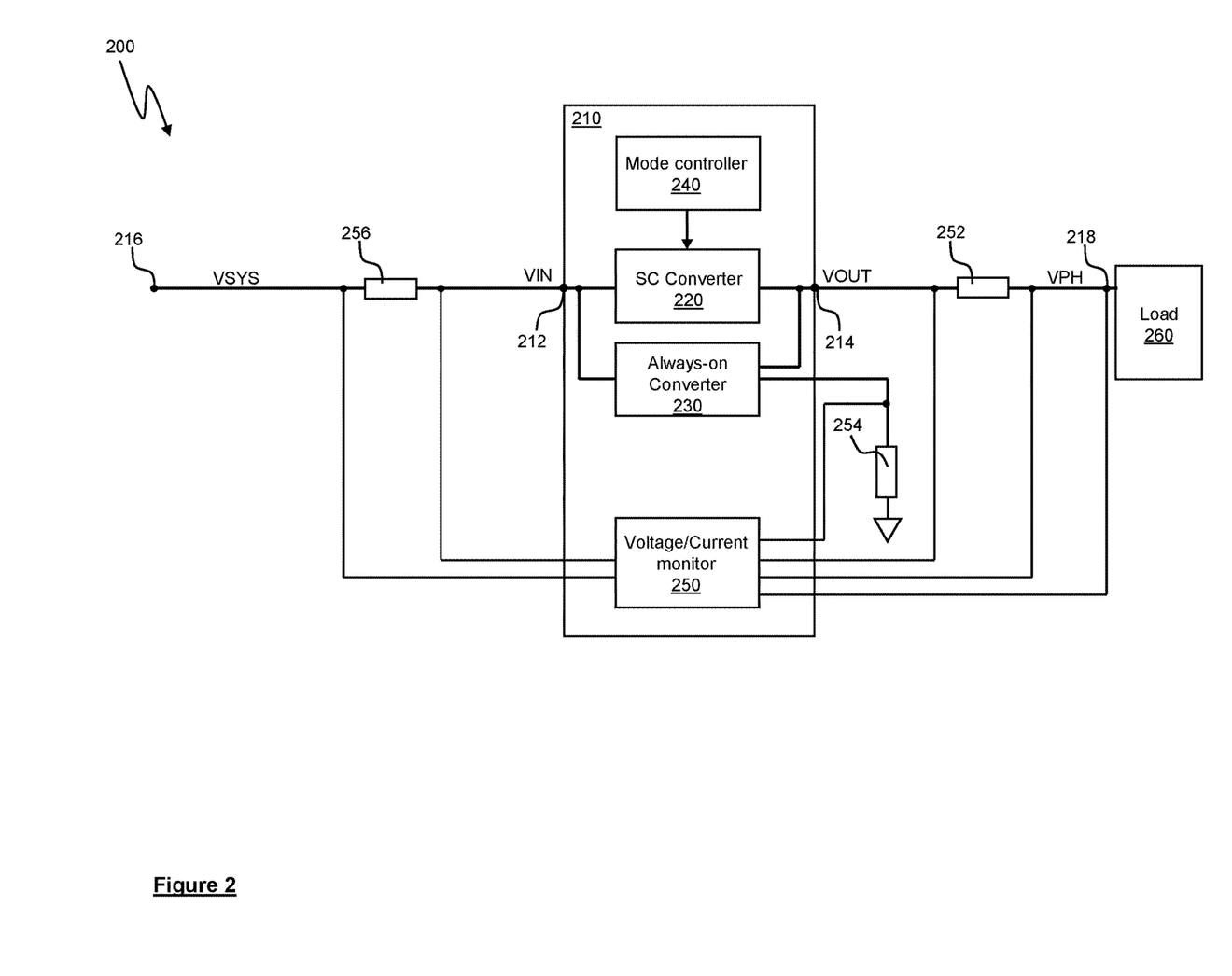
FIG. 2 is a schematic representation of a power converter system according to the present disclosure.

FIG. 2 is a schematic representation of an example power converter system according to the present disclosure. The power converter system, shown generally at 200 in FIG. 2, may be used in place of the always-on first DC-DC 142 of the power distribution system 100 of FIG. 1.

The power converter system 200 in this example comprises a power converter block 210 that includes switched capacitor DC-DC converter circuitry 220 coupled in parallel with always-on DC-DC converter circuitry 230 between an input node 212 and an output node 214 of the power converter block 210. Thus, an input of the switched capacitor DC-DC converter circuitry 220 is coupled to an input of the always-on DC-DC converter circuitry 230 and to the input node 212, and an output of the switched capacitor DC-DC power converter circuitry 220 is coupled to a first output of the always-on DC-DC power converter circuitry 230 and to the output node 214.

The power converter block 210 further includes mode controller circuitry 240 and voltage/current monitoring circuitry 250.

An output current sense resistor 252 is coupled in series between the output node 214 of the power converter block 210 and a load coupling node 218 to which a load 260 (e.g. the PMIC 150 of the power distribution system 100 of FIG. 1) can be coupled, with first and second inputs of the voltage/current monitoring circuitry 250 being coupled to respective first and second terminals of the output current sense resistor 252.

An output voltage sense resistor 254 is coupled between a second output of the always-on DC-DC converter circuitry 230 and a reference voltage supply (e.g. ground), and a third input of the voltage/current monitoring circuitry 250 is coupled between the second output of the always-on DC-DC converter circuitry 230 and the output voltage sense resistor 254.

In some examples an input current sense resistor 256 may be coupled in series between a system voltage input node 216 at which the system voltage VSYS is received and the input node 212 of the power converter block 210, with fourth and fifth inputs of the voltage/current monitoring circuitry 250 being coupled to respective first and second terminals of the input current sense resistor 256.

The always-on DC-DC converter circuitry 230 may be an inductive DC-DC power converter or an LDO, for example. Those of ordinary skill in the art will be aware of inductive DC-DC converter and LDO topologies that are suitable for use in the power converter system 200 of FIG. 2.

The mode controller circuitry 240 is configured to control operation of the switched capacitor DC-DC converter circuitry 220 based on a characteristic or parameter of a power supply output by the power converter block 210 (e.g. a characteristic or parameter of a voltage and/or a current component of the output power), as will be described in more detail below. The mode controller circuitry 240 may be implemented as a microprocessor, microcontroller, state machine or the like, or alternatively may be implemented in discrete circuitry.

The voltage/current monitoring circuitry 250 is configured to monitor an input current to the power converter block 210, an output current from the power converter block 210, an output voltage of the always-on DC-DC converter circuitry 230 of the power converter block 210, and a voltage VPH supplied to the load 260 by the power converter block 210.

The voltage/current monitoring circuitry 250 may include circuitry for generating a signal representative of a current through the output current sense resistor 252, such as analog to digital converter (ADC) circuitry configured to convert a voltage across the output current sense resistor 252 into a digital signal representative of the current through the output current sense resistor 252.

The voltage/current monitoring circuitry 250 may further include circuitry for generating a signal representative of a voltage across the output voltage sense resistor 254, such as analog to digital converter (ADC) circuitry configured to generate a digital signal representing a voltage across the output voltage sense resistor 254.

The voltage/current monitoring circuitry 250 may further include circuitry for generating a signal representative of the voltage VPH supplied to the load 260, such as analog to digital converter (ADC) circuitry configured to generate a digital signal representing the voltage VPH.

If the input current sense resistor 256 is present, the voltage/current monitoring circuitry 250 may further include circuitry for generating a signal representative of a current through the input current sense resistor 256, such as analog to digital converter (ADC) circuitry configured to convert a voltage across the input current sense resistor 256 into a digital signal representative of the current through the input current sense resistor 256.

In operation of the power converter system 200, a system voltage VSYS is received (e.g. from a master charger of the kind shown at 130 in FIG. 1, or from a battery of the kind shown at 120 in FIG. 1) at the input node 212 of the power converter block 210.

In a first mode of operation of the power converter system 200 (which supports operation of the load 260 in a low-power or sleep mode of operation), the always-on DC-DC converter circuitry 230 is activated or enabled and operates to supply output power to the load 260, by generating an output voltage VOUT which is supplied to the load coupling node 218 (via the output node 214 of the power converter block 210). The switched capacitor DC-DC converter circuitry 220 is deactivated or disabled, such that in the first mode of operation only the always-on DC-DC converter circuitry 230 supplies output power to the load 260. When the load 260 is operating in a low-power or sleep mode, only a relatively small quiescent current is drawn from the power converter block 210. Thus, when the load 260 is operating in its low-power or sleep mode, the power converter system 200 may be said to be in a quiescent operating condition.

The voltage/current monitoring circuitry 250 is operative to monitor a characteristic or parameter of the output power supplied to the load 260, to detect if the load 260 has exited its low-power or sleep mode of operation (and therefore if the power converter system is not in its quiescent operating condition). If the voltage/current monitoring circuitry 250 detects that the load 260 has exited its low-power or sleep mode, it outputs a first detection signal to the mode controller circuitry 240, which in turn outputs an enable signal to the switched capacitor DC-DC converter circuitry 220 to enable the switched capacitor DC-DC converter circuitry 220, thereby switching the power converter system 200 into a second mode of operation which supports a full-power mode of operation of the load 260. When the load 260 is operating in its full-power mode, the power converter system 200, a higher current is drawn from the power converter block 210, and the power converter system 200 may be said to be in an active operating condition.

In some examples, the mode controller circuitry 240 may also output a disable signal to the always-on DC-DC converter circuitry 230 after enabling the switched capacitor DC-DC converter circuitry 220 (e.g. after a predetermined delay to allow the switched capacitor DC-DC converter circuitry 220 to reach a steady-state operating condition).

Alternatively, the always-on DC-DC converter circuitry 230 main remain enabled after a transition of the power converter system 200 to its second mode, in order to support the output voltage and/or output current requirements of the load 260 when operating in its full-power mode.

In the second mode of operation, the voltage/current monitoring circuitry 250 continues to monitor a characteristic or parameter of the power supplied to the load 260, to detect if the load 260 has exited its full-power mode of operation (e.g. if the load 260 has entered its low-power or sleep mode). If the voltage/current monitoring circuitry 250 detects that the load 260 has exited its full-power mode (and therefore that the power converter system 200 is in its quiescent operating condition), it outputs a second detection signal to the mode controller circuitry 240, which in turn outputs a disable signal to the switched capacitor DC-DC converter circuitry 220 to disable the switched capacitor DC-DC converter circuitry 220, thereby transitioning the power converter system 200 back into its first mode of operation.

Thus, the power converter system 200 is operable in a first, quiescent, operating mode or condition, in which the always-on DC-DC converter circuitry 230 supplies power to the load 260 when the load 260 is in a low-power or sleep mode, and is operable in a second, active operating mode or condition, in which the switched capacitor DC-DC-converter circuitry 220 supplies power to the load 260 when the load is operating in a full-power mode.

In the first, quiescent mode or operating condition, the current drawn by the always-on DC-DC converter circuitry 230 is lower than the current that would be drawn by the switched capacitor DC-DC converter circuitry 220 if the switched capacitor DC-DC converter circuitry 220 were active to supply power to the load 260 in its low-power or sleep mode, thus minimising power consumption of the power converter block 210 when the load 260 is in its low-power or sleep mode.

In the second, active, operating mode or condition, the switched capacitor DC-DC converter circuitry 220 is able to supply a relatively high current to the load with high efficiency, thus minimising the power consumption of the power converter block 210 when the load 260 is in its full-power mode.

In operation of the power converter system 200 in its first mode, the voltage/current monitoring circuitry 250 may detect a change in the mode of operation of the load 260 (and thus a change in the operating condition of the power converter system 200) to trigger a transition from the first mode of operation of the power converter system 200 to the second mode of operation of the power converter system 200 in a number of different ways.

In examples in which the always-on DC-DC converter circuitry 230 comprises inductive DC-DC converter circuitry, the voltage/current monitoring circuitry 250 may be configured to monitor a ripple current of the always-on DC-DC converter circuitry 230 and to output the first detection signal to cause the mode controller circuitry 240 to transition the power converter system 200 into its second mode of operation, based on the monitored ripple current. For example, the voltage/current monitoring circuitry 250 may be configured to compare a signal (e.g. a voltage) indicative of a current through the output current sense resistor 252 to a signal (e.g. a voltage) indicative of a first predetermined peak ripple current threshold to determine whether a peak output ripple current of the always-on DC-DC converter circuitry 230 is equal to or greater than the first predetermined peak ripple current threshold, indicating that a current drawn by the load 260 is consistent with the current drawn by the load 260 when operating in its full-power mode. If a magnitude of the signal indicative of the current through the output current sense resistor 252 is equal to or greater than a magnitude of the signal indicative of the first predetermined peak ripple current threshold, the voltage/current monitoring circuitry 250 outputs the first detection signal to the mode controller circuitry 240 to cause the power converter system 200 to transition into its second mode of operation.

Additionally or alternatively, in examples in which the always-on DC-DC converter circuitry 230 comprises inductive DC-DC converter circuitry, or in examples in which the always-on DC-DC converter circuitry 230 comprises LDO circuitry, the voltage/current monitoring circuitry 250 may be configured to monitor the voltage VPH at the load coupling node 218 and to output the first detection signal to cause the mode controller circuitry 240 to transition the power converter system 200 into its second mode of operation based on the monitored voltage VPH. For example, the voltage/current monitoring circuitry 250 may be configured to compare the voltage VPH (or a signal indicative of the voltage VPH) to a first predetermined system output voltage threshold (or a signal indicative of a first predetermined system output voltage threshold). If the monitored voltage VPH is equal to or greater than the first predetermined system output voltage threshold, indicating that the voltage VPH supplied the load 260 is consistent with the voltage VPH supplied to the load 260 when operating in its full-power mode, the voltage/current monitoring circuitry 250 outputs the first detection signal to the mode controller circuitry 240 to cause the power converter system 200 to transition into its second mode of operation.

Additionally or alternatively, in examples in which the always-on DC-DC converter circuitry 230 comprises inductive DC-DC converter circuitry, or in examples in which the always-on DC-DC converter circuitry 230 comprises LDO circuitry, the voltage/current monitoring circuitry 250 may be configured to monitor an output voltage of the always-on DC-DC converter circuitry 230 (represented by the voltage across the output voltage sense resistor 254) and to output the first detection signal to cause the mode controller circuitry 240 to transition the power converter system 200 into its second mode of operation based on the monitored always-on DC-DC converter output voltage. For example, the voltage/current monitoring circuitry 250 may be configured to compare the always-on DC-DC converter output voltage (or a signal indicative of the always-on DC-DC converter output voltage) to a first predetermined always-on DC-DC converter output voltage threshold (or a signal indicative of a first predetermined always-on DC-DC converter output voltage threshold). If the monitored always-on DC-DC converter output voltage is equal to or greater than the first predetermined always-on DC-DC converter output voltage threshold, indicating that the always-on DC-DC converter output voltage is consistent with the always-on DC-DC converter output voltage when the load 260 is operating in its full-power mode, the voltage/current monitoring circuitry 250 outputs the first detection signal to the mode controller circuitry 240 to cause the power converter system 200 to transition into its second mode of operation.

In some examples the voltage/current monitoring circuitry 250 is operative to output the first detection signal to the mode controller circuitry 240 if one of the above-described output power conditions is fulfilled. In other examples, the voltage/current monitoring circuitry 250 is operative to output the first detection signal to the mode controller circuitry 240 only if two or more of the above-described output power conditions are fulfilled.

For example, the voltage/current monitoring circuitry 250 may be operative to output the first detection signal to the mode controller circuitry 240 if the peak output ripple current of the always-on DC-DC converter circuitry 230 is equal to or greater than the predetermined peak ripple current threshold, or if the voltage VPH is equal to or greater than the first predefined voltage threshold, or if the monitored always-on DC-DC converter output voltage is equal to or greater than the second predetermined threshold voltage. Alternatively, the voltage/current monitoring circuitry 250 may be operative to output the first detection signal to the mode controller circuitry 240 only if two or more of these conditions are met, to reduce the risk that transient changes in ripple current, VOUT or always-on DC-DC converter output voltage may falsely triggering a transition to the second mode of operation of the power converter system 200.

Similarly, in operation of the power converter system 200 in its second mode, the voltage/current monitoring circuitry 250 may detect a change in the mode of operation of the load 260 to trigger a transition to the first mode of operation of the power converter system 200 in a number of different ways.

Thus, in examples in which the always-on DC-DC converter circuitry 230 comprises inductive DC-DC converter circuitry, the voltage/current monitoring circuitry 250 may be configured to compare the signal indicative of the current through the output current sense resistor 252 to a signal indicative of the first predetermined peak ripple current threshold or to a signal indicative of a second predetermined peak ripple current threshold (which is lower than the first predetermined peak ripple current threshold, to provide a degree of hysteresis) to determine whether a peak output ripple current of the always-on DC-DC converter circuitry 230 is less than the first (or second) predetermined peak ripple current threshold, indicating that a current drawn by the load 260 is consistent with the current drawn by the load 260 when operating in its low-power or sleep mode. If a magnitude of the signal indicative of the current through the output current sense resistor 252 is less than a magnitude of the signal indicative of the first (or second) predetermined peak ripple current threshold, the voltage/current monitoring circuitry 250 outputs the second detection signal to the mode controller circuitry 240 to cause the power converter system 200 to transition into its first mode of operation.

Additionally or alternatively, in examples in which the always-on DC-DC converter circuitry 230 comprises inductive DC-DC converter circuitry, or in examples in which the always-on DC-DC converter circuitry 230 comprises LDO circuitry, the voltage/current monitoring circuitry 250 may be configured to compare the voltage VPH (or a signal indicative of the voltage VPH) to the first predetermined system output voltage threshold or to a second predetermined system output voltage threshold which is lower than the first predetermined system output voltage threshold, to provide some hysteresis (or a signal indicative of a first or second predetermined system output voltage threshold). If the monitored voltage VPH is equal to or greater than the first or second predetermined system output voltage threshold, indicating that the voltage VPH supplied to the load 260 is consistent with the voltage VPH supplied to the load 260 when operating in its low-power or sleep mode, the voltage/current monitoring circuitry 250 outputs the second detection signal to the mode controller circuitry 240 to cause the power converter system 200 to transition into its first mode of operation.

Additionally or alternatively, in examples in which the always-on DC-DC converter circuitry 230 comprises inductive DC-DC converter circuitry, or in examples in which the always-on DC-DC converter circuitry 230 comprises LDO circuitry, the voltage/current monitoring circuitry 250 may be configured to compare the always-on DC-DC converter output voltage (or a signal indicative of the always-on DC-DC converter output voltage) to a first predetermined always-on DC-DC converter output voltage threshold or to a second predetermined always-on DC-DC converter output voltage threshold which is lower than the first predetermined always-on DC-DC converter output voltage threshold, to provide some hysteresis (or a signal indicative of a first or second predetermined always-on DC-DC converter output voltage threshold). If the monitored always-on DC-DC converter output voltage is equal to or greater than the first or second predetermined threshold voltage, indicating that the always-on DC-DC converter output voltage is consistent with the always-on DC-DC converter output voltage when the load 260 is operating in its low-power or sleep mode, the voltage/current monitoring circuitry 250 outputs the second detection signal to the mode controller circuitry 240 to cause the power converter system 200 to transition into its first mode of operation.

As when transitioning from the first mode of operation to the second mode of operation of the power converter system 200, in some examples the voltage/current monitoring circuitry 250 is operative to output the second detection signal to the mode controller circuitry 240 to cause the power converter system 200 to transition into its first mode of operation if one of the above-described output power conditions is fulfilled. In other examples, the voltage/current monitoring circuitry 250 is operative to output the second detection signal to the mode controller circuitry 240 only if two or more of the above-described output power conditions are fulfilled.

Figure 3:
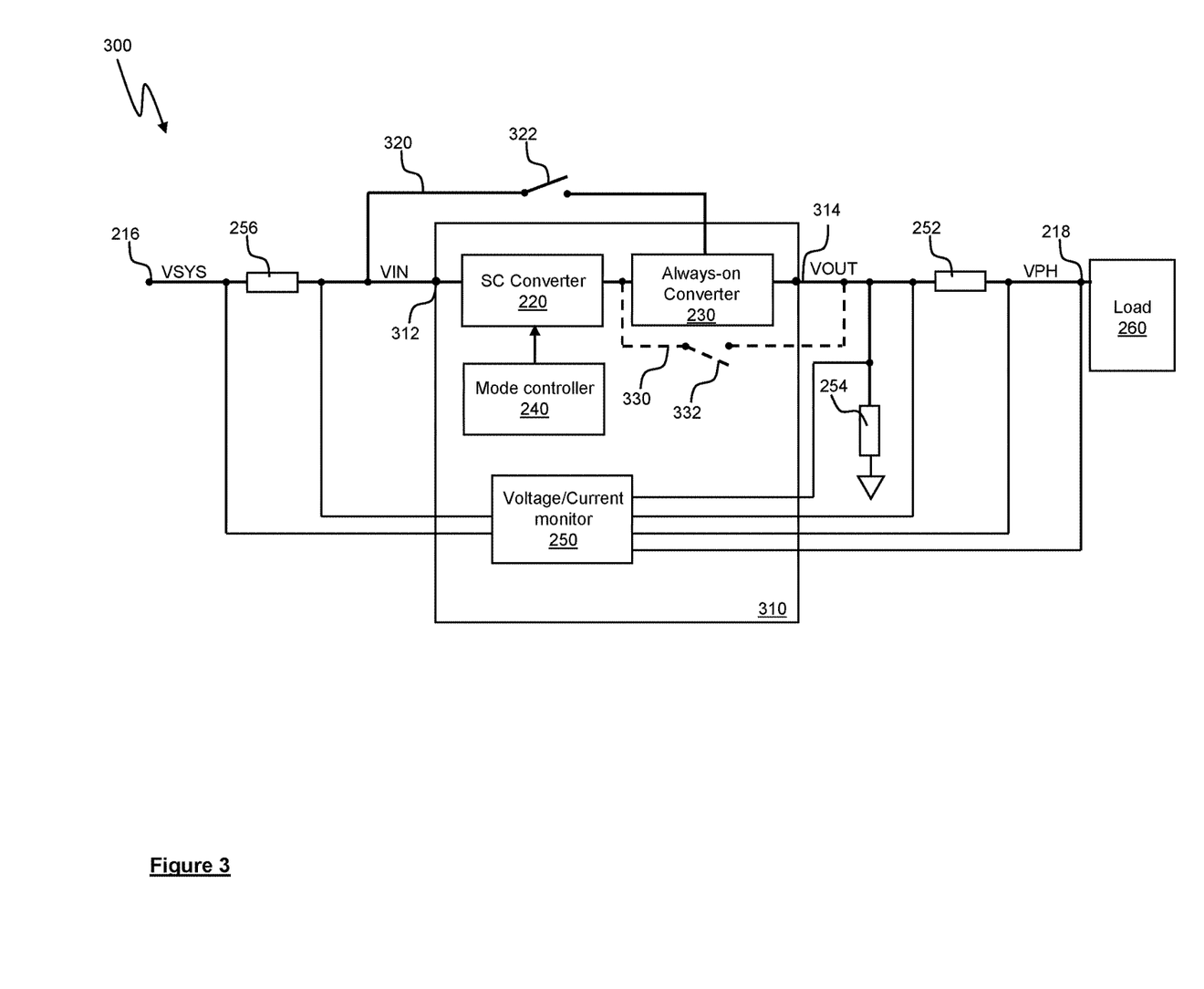
FIG. 3 is a schematic representation of an alternative power converter system according to the present disclosure.

FIG. 3 is a schematic representation of an alternative power converter system according to the present disclosure. The alternative power converter system, shown generally at 300 in FIG. 3, has many features in common with the power converter system 200 of FIG. 2. Such common features are denoted by the same reference numerals in FIGS. 2 and 3 and will not be described again in detail here, for the sake of clarity and brevity.

The alternative power converter system 300 differs from the power converter system in that the switched capacitor DC-DC converter circuitry 220 and the always-on DC-DC converter circuitry 230 are coupled in series between an input node 312 and an output node 314 of a power converter block 310, such that an input of the switched capacitor DC-DC converter circuitry 220 is coupled to the input node 312, an output of the switched capacitor DC-DC converter circuitry 220 is coupled to an input of the always-on DC-DC converter circuitry 230, and an output of the always-on DC-DC converter circuitry 230 is coupled to the output node 314.

The alternative power converter system 300 further comprises a bypass path 320 between the input node 312 and the always-on DC-DC converter circuitry 230, which can be selectively activated to couple always-on DC-DC converter circuitry 230 directly to the input node 312, thus bypassing the switched capacitor DC-DC converter circuitry 220. In the example illustrated in FIG. 3, the bypass path 320 includes a bypass switch 322 coupled between the input node 312 and the always-on DC-DC converter circuitry 230. When the bypass switch 322 is closed, the bypass path 320 is activated to bypass the switched capacitor DC-DC converter circuitry 220, whereas when the bypass switch 322 is open the bypass path 320 is deactivated.

In an alternative arrangement, the power converter system 300 of FIG. 3 may include a selectable direct output path 330 between the output of the switched capacitor DC-DC converter circuitry 220 and the output node 314 of the power converter block 310, which can be activated (e.g. by closing a direct output path selector switch 332 in the direct output path 330) to couple the output of the of the switched capacitor DC-DC converter circuitry 220 to the output node 314. In this arrangement the always-on DC-DC converter circuitry 230 comprises an internal bypass path which is activated when the selectable direct output path 330 is activated.

The alternative power converter system 300 of FIG. 3 is operable in a first, low-quiescent current, mode and a second, high-efficiency, mode, in a similar manner to the power converter system 200 of FIG. 2.

However, in operation of the alternative power converter system 300 of FIG. 3 in its first mode, instead of or in addition to deactivating or disabling the switched capacitor DC-DC converter circuitry 220, the bypass path 320 is activated to bypass the switched capacitor DC-DC converter circuitry 220, such that only the always-on DC-DC converter circuitry 230 supplies power to the load 260. In the alternative arrangement described above, in the first mode of operation of the power converter system 300 of FIG. 3, the selectable direct output path 330 and the internal bypass path of the always-on DC-DC converter circuitry are deactivated, such that the always-on DC-DC converter is active and supplies power to the load 260.

In operation of the alternative power converter system 300 of FIG. 3 in its second mode, the switched capacitor DC-DC converter circuitry 220 is activated or enabled, such that the switched capacitor DC-DC converter circuitry 220 supplies power to the load 260.

As in the power converter system 200 of FIG. 2, the always-on DC-DC converter circuitry 230 may also be activated or enabled in the second mode of operation of the power converter system 300 of FIG. 3, in order to support the output voltage and/or output current requirements of the load 260 when operating in its full-power mode.

Alternatively, the always-on DC-DC converter circuitry 230 may be deactivated or disabled in the second mode of operation after enabling the switched capacitor DC-DC converter circuitry 220 (e.g. after a predetermined delay to allow the switched capacitor DC-DC converter circuitry 220 to reach a steady-state operating condition). In the alternative arrangement described above, in the second mode of operation of the power converter system 300 of FIG. 3, the selectable direct output path 330 and the internal bypass path of the always-on DC-DC converter circuitry are activated, such that the always-on DC-DC converter is inactive and only the switched capacitor DC-DC converter circuitry 220 supplies power to the load 260.

The voltage/current monitoring circuitry 250 of the power converter system 300 of FIG. 3 is operable in the same manner as the voltage/current monitoring circuitry 250 of the power converter system 200 of FIG. 2 to detect a change in the mode of operation of the load 260 (and thus a change in the operating condition of the power converter system 300) to trigger a transition from the first mode of operation to the second mode of operation of the power converter system 300, or from the second mode of operation to the first mode of operation of the power converter system 300.

Figure 4:
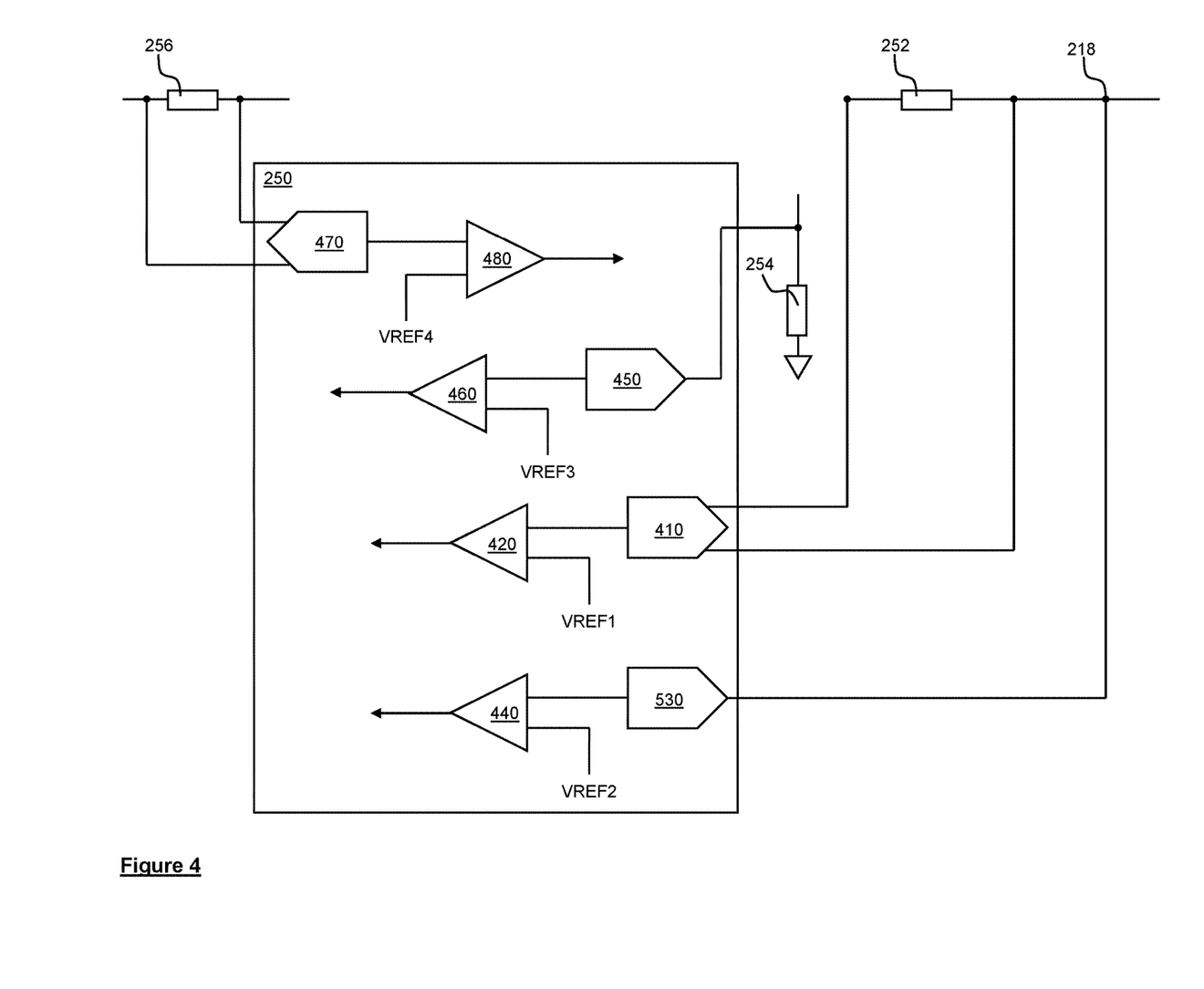
FIG. 4 is a schematic representation of voltage/current monitoring circuitry for the power converter systems of FIGS. 3 and 4.

FIG. 4 is a schematic representation of circuitry suitable for implementing the voltage/current monitoring circuitry 250 of the power converter systems 200, 300.

In the example shown in FIG. 4, the voltage/current monitoring circuitry 250 includes first analog to digital (ADC) circuitry 410, first digital comparator circuitry 420, second ADC circuitry 430, second digital comparator circuitry 440, third ADC circuitry 450 and third digital comparator circuitry 460. If the power converter system 200, 300 includes the input current sense resistor 256, the voltage/current monitoring circuitry 250 may further include fourth ADC circuitry 470 and fourth digital comparator circuitry 480.

The first ADC circuitry 410 is configured to convert an analog voltage signal indicative of a voltage across the output current sense resistor 252 (representing a current through the output current sense resistor 252, and thus a current drawn by the load 260) into a first digital output signal. The first digital comparator circuitry 420 is configured to compare this first digital output signal to a first reference signal VREF1.

When the power converter system 200, 300 is operating in its first mode, the first reference signal VREF1 is indicative of the first predetermined peak ripple current, such that an output of the first digital comparator circuitry 420 is indicative of whether a peak output ripple current of the always-on DC-DC converter circuitry 230 is equal to or greater than the first predetermined peak ripple current threshold and thus if a transition to the second mode of operation of the power converter system 200,300 may be required.

When the power converter system 200, 300 is operating in its second mode, the first reference signal VREF1 is indicative of the first predetermined peak ripple current or the second predetermined peak ripple current, such that an output of the first digital comparator circuitry 420 is indicative of whether a peak output ripple current of the always-on DC-DC converter circuitry 230 is less than the first or second predetermined peak ripple current threshold and thus if a transition to the first mode of operation of the power converter system 200,300 may be required.

Similarly, the second ADC circuitry 430 is configured to convert an analog voltage signal indicative of the voltage VPH at the load coupling node 218 into a second digital output signal. The second digital comparator circuitry 460 is configured to compare the second digital output signal to a second reference signal VREF2.

When the power converter system 200, 300 is operating in its first mode, the second reference signal VREF2 is indicative of the first predetermined system output voltage threshold, such that an output of the first digital comparator circuitry 420 is indicative of whether the voltage VPH is equal to or greater than the first predetermined system output voltage threshold and thus if a transition to the second mode of operation of the power converter system 200,300 may be required.

When the power converter system 200, 300 is operating in its second mode, the second reference signal VREF2 is indicative of the first predetermined system output voltage threshold or the second predetermined system output voltage threshold, such that an output of the second digital comparator circuitry 440 is indicative of whether the voltage VPH is less than the first or second predetermined system output voltage threshold and thus if a transition to the first mode of operation of the power converter system 200,300 may be required.

Similarly, the third ADC circuitry 450 is configured to convert an analog voltage signal indicative of a voltage across the output voltage sense resistor 254 into a third digital output signal. The third digital comparator circuitry 460 is configured to compare this first digital output signal to a third reference signal VREF3.

When the power converter system 200, 300 is operating in its first mode, the third reference signal VREF3 is indicative of the first predetermined always-on DC-DC converter output voltage threshold, such that an output of the third digital comparator circuitry 460 is indicative of whether the always-on DC-DC converter output voltage is equal to or greater than the first predetermined always-on DC-DC converter output voltage threshold and thus if a transition to the second mode of operation of the power converter system 200,300 may be required.

When the power converter system 200, 300 is operating in its second mode, the third reference signal VREF3 is indicative of the first predetermined always-on DC-DC converter output voltage threshold or the second predetermined always-on DC-DC converter output voltage threshold, such that an output of the third digital comparator circuitry 460 is indicative of whether the always-on DC-DC converter output voltage is less than the first or second predetermined always-on DC-DC converter output voltage threshold and thus if a transition to the first mode of operation of the power converter system 200,300 may be required.

The fourth ADC circuitry 470, if present, is configured to convert an analog voltage signal indicative of a voltage across the input current sense resistor 256 (representing a current through the input current sense resistor 256) into a fourth digital output signal. The fourth digital comparator circuitry 480 is configured to compare this fourth digital output signal to a fourth reference signal VREF4, which may be indicative of an input current threshold. The result of this comparison may be indicative that a transition from the first mode of operation to the second mode of operation or a transition from the second mode of operation to the first mode of operation of the power converter system to the second may be required.

The power converter block 210, 310 may be implemented as a one or more integrated circuits (chips) implementing the switched capacitor DC-DC converter circuitry 220, the always-on DC-DC converter circuitry 230, the mode controller circuitry 240, and the voltage/current monitoring circuitry 250.

Alternatively, the power converter block 210 may be implemented as a combination of integrated circuitry and off-chip components.

For example, the power converter block 210 may comprise an integrated circuit implementing a switch network of the switched capacitor DC-DC converter circuitry 220 and switch network of the always-on DC-DC converter circuitry 230, with one or more capacitors of the switched capacitor DC-DC converter circuitry 220 being provided externally of the integrated circuit (i.e. off-chip), and one or more capacitors and/or inductors of the always-on DC-DC converter circuitry 230 being provided externally of the integrated circuit (i.e. off-chip).

As will be apparent from the foregoing disclosure, the power converter system 200, 300 of the present disclosure is capable of supplying a required voltage and/or current to a load 260 with high efficiency when the load 260 is operating in its full-power mode of operation, through the switched capacitor DC-DC converter circuitry 220 (and, in some examples, also the always-on DC-DC converter circuitry 230). When the load 260 is operating in a low-power or sleep mode, the power converter system 200, 300 is capable of operating with reduced quiescent power consumption, by operating only the always-on DC-DC converter circuitry 230.

The power converter systems described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units

The invention claimed is:

1. A power converter system comprising:
   a switched capacitor power converter;
   an always-on power converter; and
   a controller,
   wherein the power converter system is operable in a first mode of operation in which only the always-on power converter supplies output power and a second mode of operation in which the switched capacitor power converter supplies output power, and
   wherein the controller is configured to transition the power converter system from the first mode to the second mode based on a parameter of a current and/or a voltage of output power supplied by the power converter system.

2. The power converter system of claim 1, wherein the parameter of the current and/or the voltage of the output power comprises one or more of:
   a magnitude of an output current of the always-on converter;
   a magnitude of an output voltage of the always-on converter; and
   a magnitude of an output voltage of the power converter system.

3. The power converter system of claim 1, wherein the switched capacitor power converter is coupled in parallel with the always-on power converter.

4. The power converter system of claim 1, wherein the switched capacitor power converter is coupled in series with the always-on power converter.

5. The power converter system of claim 4, wherein the controller is configured to bypass the switched capacitor power converter in the first mode.

6. The power converter system of claim 1, wherein the always-on power converter circuitry comprises inductive converter circuitry.

7. The power converter system of claim 6, wherein the parameter of the current and/or the voltage of the output power comprises a magnitude of an output ripple current of the always-on converter.

8. The power converter system of claim 1, wherein the always-on power converter circuitry comprises low dropout regulator circuitry.

9. The power converter system of claim 1, further comprising voltage and/or current monitoring circuitry configured to monitor one or more of:
   an output current of the always-on converter;
   an output voltage of the always-on converter; and
   an output voltage of the power converter system.

10. The power converter system of claim 1, wherein the controller is further configured to transition the power converter system from the second mode to the first mode based on a parameter of a current and/or a voltage of the output power.

11. The power converter system of claim 1, wherein the always-on converter is disabled or deactivated in the second mode of operation of the power converter system.

12. The power converter system of claim 1, wherein the always-on converter and the switched capacitor power converter are both enabled or activated in the second mode of operation of the power converter system.

13. An integrated circuit comprising:
    the controller; and/or
    a switch network for the switched capacitor power converter; and/or
    a switch network for the always-on power converter of the power converter system of claim 1.

14. A host device comprising the power converter system of claim 1.

15. The host device of claim 14, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console for a VR or AR device, a mobile telephone, a portable audio player or other portable device.

16. A power converter system comprising:
    a switched capacitor power converter;
    an always-on power converter; and
    a controller configured to deactivate and/or bypass the switched capacitor power converter in response to detection that the power converter system is in a quiescent operating condition.

* * * * *